United States Patent
Han et al.

(10) Patent No.: US 11,279,897 B2
(45) Date of Patent: *Mar. 22, 2022

(54) MODIFIED OIL SOLUBLE POLYALKYLENE GLYCOLS

(71) Applicant: Dow Global Technologies LLC, Midland, MI (US)

(72) Inventors: Yaokun Han, Shanghai (CN); Cheng Shen, Shanghai (CN); Martin R. Greaves, Baar (CH); Yong Zhao, Shanghai (CN)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/956,759

(22) PCT Filed: Dec. 25, 2017

(86) PCT No.: PCT/CN2017/118222
§ 371 (c)(1),
(2) Date: Jun. 22, 2020

(87) PCT Pub. No.: WO2019/126923
PCT Pub. Date: Jul. 4, 2019

(65) Prior Publication Data
US 2020/0318024 A1 Oct. 8, 2020

(51) Int. Cl.
C10M 105/48 (2006.01)
C10M 107/34 (2006.01)
C08G 65/332 (2006.01)
C10N 30/00 (2006.01)
C10N 20/02 (2006.01)
C10N 20/04 (2006.01)
C10N 30/02 (2006.01)

(52) U.S. Cl.
CPC ......... C10M 107/34 (2013.01); C08G 65/332 (2013.01); C10M 2209/105 (2013.01); C10M 2209/106 (2013.01); C10M 2209/1023 (2013.01); C10N 2020/02 (2013.01); C10N 2020/04 (2013.01); C10N 2030/02 (2013.01); C10N 2030/74 (2020.05)

(58) Field of Classification Search
CPC ........ C10M 107/34; C10M 2209/1023; C10M 2209/105; C10M 2209/106; C10M 2209/103; C10M 107/32; C10M 2209/109; C08G 65/332; C10N 2030/74; C10N 2020/02; C10N 2020/04; C10N 2030/02
USPC ........................................................ 508/462
See application file for complete search history.

(56) References Cited

U.S. PATENT DOCUMENTS

| 2,620,304 A | 12/1952 | Stewart et al. |
| 2,620,308 A | 12/1952 | Stewart et al. |
| 3,530,070 A | 9/1970 | Wickings et al. |
| 4,959,169 A | 9/1990 | McGraw et al. |
| 4,968,453 A * | 11/1990 | Wada ............... C10M 111/04 508/492 |
| 5,707,945 A | 1/1998 | Cooban et al. |
| 10,113,134 B2 | 10/2018 | Khelidj et al. |
| 2014/0249063 A1 | 9/2014 | Greaves et al. |
| 2017/0211009 A1 * | 7/2017 | Khelidj ................ C10M 107/34 |

FOREIGN PATENT DOCUMENTS

| CN | 1084523 | 3/1994 |
| EP | 0664331 | 7/1995 |
| JP | H0368401 A1 | 3/1991 |
| JP | 2003155339 A | 5/2003 |
| WO | 2014124698 | 8/2014 |

OTHER PUBLICATIONS

International Search Report & Written Opinion for related PCT Application PCT/CN2017/118222, dated Sep. 7, 2018 (10 pgs).

* cited by examiner

Primary Examiner — Prem C Singh
Assistant Examiner — Francis C Campanell

(57) ABSTRACT

Embodiments of the present disclosure are directed towards esterified oil soluble polyalkylene glycols of Formula (I): $R^1[O(R^2O)_n(R^3O)_m(C=O)R^4]_p$, where $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1, 2-propylene oxide; $R^3O$ is an oxybutylene moiety derived from butylene oxide, where $R^2O$ and $R^3O$ are in a block or a random distribution; $R^4$ is a linear alkyl with to 18 carbon atoms, a branched alkyl with 4 to 18 carbon atoms or an aryl with 6 to 18 carbon atoms; n and m are each independently integers ranging from 0 to 20 wherein n+m is greater than 0, and p is an integer from 1 to 4.

10 Claims, No Drawings

MODIFIED OIL SOLUBLE POLYALKYLENE GLYCOLS

This application is a National Stage Application under 35 U.S.C. § 371 of International Application Number PCT/CN2017/118222, filed Dec. 25, 2017 and published as WO 2019/126923 on Jul. 4, 2019, the entire contents of which are incorporated herein by reference in its entirety

FIELD OF DISCLOSURE

Embodiments of the present disclosure are directed towards polyalkylene glycols and more specifically to modified oil soluble polyalkylene glycols.

BACKGROUND

Lubricants may be utilized for a variety of applications. Lubricants can have various functions, such as controlling friction between surfaces of moving parts, reducing wear of moving parts, reducing corrosion of surfaces of moving parts, damping mechanical shock, and/or forming a seal.

SUMMARY

The present disclosure provides esterified oil soluble polyalkylene glycols of Formula I:

                                       Formula I where $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1,2-propylene oxide; $R^3O$ is an oxybutylene moiety derived from butylene oxide, where $R^2O$ and $R^3O$ are in a block or a random distribution; $R^4$ is a linear alkyl with 1 to 18 carbon atoms, a branched alkyl with 4 to 18 carbon atoms or an aryl with 6 to 18 carbon atoms; n and m are each independently integers ranging from 0 to 20 where n+m is greater than 0, and p is an integer from 1 to 4. Embodiments of the esterified oil soluble polyalkylene glycols can have a molecular weight value for $(R^3O)_m$ divided by a sum of the molecular weight values of $(R^2O)_n$ and $(R^3O)_m$ has a value of 0.5 to 0.95. Preferably, $R^1$ is a linear alkyl or branched as described herein.

The esterified oil soluble polyalkylene glycols can have a kinematic viscosity at 100° C. that is 6 cSt or less. The esterified oil soluble polyalkylene glycols can have a kinematic viscosity at 40° C. that is less than 25 cSt. The esterified oil soluble polyalkylene glycols of the present disclosure can also have a viscosity index determined according to ASTM D2270 from 130 to 200.

The present disclosure provides a method for reducing NOACK Air volatility according to ASTM D6375, where the method includes reacting a low viscosity oil soluble polyalkylene glycol with a carboxylic acid to provide and esterified oil soluble polyalkylene glycol having Formula I:

                                       Formula I where $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1,2-propylene oxide; $R^3O$ is an oxybutylene moiety derived from butylene oxide, where $R^2O$ and $R^3O$ are in a block or a random distribution; $R^4$ is a linear alkyl with 1 to 18 carbon atoms, a branched alkyl with 4 to 18 carbon atoms or an aryl with 6 to 18 carbon atoms; n and m are each independently integers ranging from 0 to 20 where n+m is greater than 0, p is an integer from 1 to 4 and where the esterified oil soluble polyalkylene glycol has a reduced NOACK Air volatility as compared to the low viscosity oil soluble polyalkylene glycol.

The present disclosure also provides for a method for providing a decreased viscosity as determined according to ASTM D7042, where the method includes reacting a low viscosity oil soluble polyalkylene glycol with a carboxylic acid to provide an esterified oil soluble polyalkylene glycol having Formula I:

                                       Formula I where $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1,2-propylene oxide; $R^3O$ is an oxybutylene moiety derived from butylene oxide, where $R^2O$ and $R^3O$ are in a block or a random distribution; $R^4$ is a linear alkyl with 1 to 18 carbon atoms, a branched alkyl with 4 to 18 carbon atoms or an aryl with 6 to 18 carbon atoms; n and m are each independently integers ranging from 0 to 20 wherein n+m is greater than 0, and p is an integer from 1 to 4 and where the esterified oil soluble polyalkylene glycol has a decreased viscosity as compared to the low viscosity oil soluble polyalkylene glycol at a temperature at or below 0° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The present disclosure provides esterified oil soluble polyalkylene glycols of Formula I:

                                       Formula I where $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1,2-propylene oxide; $R^3O$ is an oxybutylene moiety derived from butylene oxide, where $R^2O$ and $R^3O$ are in a block or a random distribution; $R^4$ is a linear alkyl with 1 to 18 carbon atoms, a branched alkyl with 4 to 18 carbon atoms or an aryl with 6 to 18 carbon atoms; n and m are each independently integers ranging from 0 to 20 where n+m is greater than 0, and p is an integer from 1 to 4. In one embodiment, n+m is 3 to 12. The esterified oil soluble polyalkylene glycols disclosed herein are reaction products, which are formed by reacting an oil soluble polyalkylene glycol and an acid.

The esterified oil soluble polyalkylene glycols disclosed herein can have one or more properties that are desirable for various applications. For instance, viscosity index is a measure of how the viscosity of the lubricant changes with temperature. For lubricants, relatively lower viscosity index values can indicate a greater reduction in a lubricant's viscosity at higher temperatures, as compared to a lubricant having a relatively higher viscosity index value. As such, for a number of applications, relatively higher viscosity index values are advantageous so that the lubricant maintains a generally steady viscosity with less pronounced viscosity changes for extremes of temperatures that go from lower temperatures to higher temperatures. The esterified oil soluble polyalkylene glycols disclosed herein can provide higher viscosity index values, as compared to some other lubricants.

Further, some lubricants, such as low viscosity lubricants which are herein defined as having a kinematic viscosity at 40° C. of less than 25 centistokes (cSt) and a kinematic viscosity at 100° C. of 6 cSt or less, are more volatile, e.g., as compared to high viscosity lubricants. The esterified oil soluble polyalkylene glycols disclosed herein are low viscosity lubricants, i.e. the esterified oil soluble polyalkylene glycols disclosed herein, have a kinematic viscosity at 40° C. of less than 25 cSt and a kinematic viscosity at 100° C. of 6 cSt or less.

While low viscosity lubricants are desirable for a number of applications, such as automotive applications (e.g., internal combustion engines) for instance, portions of low viscosity lubricants can disadvantageously evaporate during use. As such, relatively lower NOACK volatilities, particularly NOACK volatilities in air, are advantageous so that the lubricant evaporates less during usage. The esterified oil soluble polyalkylene glycols disclosed herein can provide lower NOACK volatilities, particularly NOACK volatilities in air, as compared to some other lubricants, such as similar non-esterified oil soluble polyalkylene glycols.

Additionally, low viscosity lubricants having a relatively lower viscosity, e.g., kinematic and/or dynamic, at low temperatures, such as at or below 0° C., can advantageously help to provide lower energy losses, such as when pumping the lubricant around an automotive engine. The esterified oil soluble polyalkylene glycols disclosed herein can provide relatively lower viscosities e.g., kinematic and/or dynamic, at low temperatures, as compared to some other lubricants.

As mentioned, the esterified oil soluble polyalkylene glycols disclosed herein are formed by reacting an oil soluble polyalkylene glycol and an acid. Unlike mineral oil base oils, oil soluble polyalkylene glycols have a significant presence of oxygen in the polymer backbone. Embodiments of the present disclosure provide that oil soluble polyalkylene glycols are alcohol initiated copolymers of propylene oxide and butylene oxide, where units derived from butylene oxide are from 50 weight percent to 95 weight percent based upon a total of units derived from propylene oxide and butylene oxide. All individual values and subranges from 50 weight percent to 95 weight percent are included; for example, the oil soluble polyalkylene glycol may have units derived from butylene oxide from a lower limit of 50, 55, or 60 weight percent to an upper limit of 95, 90, or 85 weight percent based upon the total of units derived from propylene oxide and butylene oxide. For the various embodiments, the propylene oxide can be 1,2-propylene oxide and/or 1,3-propylene oxide. For the various embodiments, the butylene oxide can be selected from 1,2-butylene oxide or 2,3-butylene oxide. Preferably, 1,2-butylene oxide is used in forming the oil soluble polyalkylene glycol.

The alcohol initiator for the oil soluble polyalkylene glycol may be a monol, a diol, a triol, a tetrol, or a combination thereof. Examples of the alcohol initiator include, but are not limited to, monols such as methanol, ethanol, butanol, octanol and dodecanol. Examples of diols are ethylene glycol, 1,2-propylene glycol, 1,3-propylene glycol and 1,4 butanediol. Examples of triols are glycerol and trimethylolpropane. An example of a tetrol is pentaerythritiol. Combinations of monols, diols, triols and/or tetrol may be used. The alcohol initiator may include from 1 to 30 carbon atoms. All individual values and subranges from 1 to 30 carbon atoms are included; for example, the alcohol initiator may have from a lower limit of 1, 3, or 5 carbon atoms to an upper limit of 30, 25, or 20 carbon atoms.

The oil soluble polyalkylene glycols may be prepared by a known process with known conditions. The oil soluble polyalkylene glycols may be obtained commercially. Examples of commercial oil soluble polyalkylene glycols include, but are not limited to, oil soluble polyalkylene glycols under the trade name UCON™, such as UCON™ OSP-12 and UCON™ OSP-18 both available from The Dow Chemical Company.

The oil soluble polyalkylene glycols of the present disclosure have a kinematic viscosity at 40° C. of less than 25 centistokes (cSt) and a kinematic viscosity at 100° C. of 6 cSt or less, and therefore may be considered low viscosity lubricants. i.e., low viscosity oil soluble polyalkylene glycols.

The acid that is reacted with the oil soluble polyalkylene glycol to form the esterified oil soluble polyalkylene glycols disclosed herein can be a carboxylic acid. Examples of the acid include, but are not limited to, acetic acid, propanoic acid, pentanoic acid, e.g., n-pentanoic acid, valeric acid, e.g., isovaleric acid, caprylic acid, dodecanoic acid, combinations thereof.

To form the esterified oil soluble polyalkylene glycols disclosed herein, the oil soluble polyalkylene glycol and the acid may be reacted at a molar ratio of 10 moles of oil soluble polyalkylene glycol:1 mole of acid to 1 mole of oil soluble polyalkylene glycol:10 moles of acid. All individual values and subranges from 10:1 moles of oil soluble polyalkylene glycol to moles of acid to 1:10 moles of oil soluble polyalkylene glycol to moles of acid are included; for example oil soluble polyalkylene glycol and the acid may be reacted at a molar ratio of 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10 moles of oil soluble polyalkylene glycol to moles of acid.

The esterified oil soluble polyalkylene glycols may be prepared by a known process with known conditions. For instance, the esterified oil soluble polyalkylene glycols disclosed herein may be formed by an esterification process, e.g., Fisher Esterification. For the esterification, known components such as acid catalysts, neutralizers, and/or salt absorbers, among other known components, may be utilized. An example of an acid catalyst is p-toluenesulfonic acid, among others. Examples of neutralizers are sodium carbonate and potassium hydroxide, among others. An example of a salt absorber is magnesium silicate, among others.

The esterified oil soluble polyalkylene glycols disclosed herein are of Formula I:

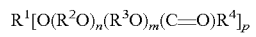

$$R^1[O(R^2O)_n(R^3O)_m(C=O)R^4]_p \qquad \text{Formula I}$$

$R^1$ is a linear alkyl having 1 to 18 carbon atoms, a branched alkyl having 4 to 18 carbon atoms or an aryl with 6 to 30 carbon atoms. Preferably, $R^1$ is a linear alkyl with 10 to 14 carbon atoms. $R^1$ corresponds to the residual of an alcohol initiator used during the polymerization of the oil soluble polyalkylene glycol discussed herein. As used herein, "alkyl group" refers to a saturated monovalent hydrocarbon group. As used herein an "aryl group" refers to a mono- or polynuclear aromatic hydrocarbon group; the aryl group may include an alkyl substituent. The aryl group, including the alkyl substituent when present, for $R^1$ can have 6 to 30 carbons. Preferably, $R^1$ is a linear alkyl or branched as described herein.

$R^2O$ is an oxypropylene moiety derived from 1,2-propylene oxide, where the resulting structure of $R^2O$ in Formula I can be either [—CH$_2$CH(CH$_3$)—O—] or [—CH(CH$_3$)

$CH_2$—O—]. $R^3O$ is an oxybutylene moiety derived from butylene oxide, where the resulting structure of $R^3O$ in Formula I can be either [—$CH_2CH(C_2H_5)$—O—] or [—CH$(C_2H_5)CH_2$—O—] when $R^3O$ is derived from 1,2-butylene oxide. For the various embodiments, $R^2O$ and $R^3O$ are in a block or a random distribution in Formula I.

$R^4$ is a linear alkyl with 1 to 18 carbon atoms, a branched alkyl with 4 to 18 carbon atoms or an aryl with 6 to 18 carbon atoms. Preferably, $R^4$ is a linear alkyl with 1 to 8 carbon atoms. As used herein, "alkyl group" refers to a saturated monovalent hydrocarbon group. As used herein an "aryl group" refers to a mono- or polynuclear aromatic hydrocarbon group; the aryl group may include an alkyl substituent. The aryl group, including the alkyl substituent when present, for $R^4$ can have 6 to 18 carbons.

Embodiments of the esterified oil soluble polyalkylene glycols can have a molecular weight value for $(R^3O)_m$ divided by a sum of the molecular weight values of $(R^2O)_n$ and $(R^3O)_m$ has a value of 0.5 to 0.95. In other words, the $(R^3O)_m$ moiety is 50 weight percent (wt. %) to 95 wt. % of the $(R^2O)_n(R^3O)_m$ moiety of Formula I. Providing that from 50 wt. % to 95 wt. % of the $(R^2O)_n(R^3O)_m$ moiety of Formula I is derived from $(R^3O)_m$ helps to ensure that the esterified oil soluble polyalkylene glycol of Formula I is oil soluble.

Correspondingly, the esterified oil soluble polyalkylene glycols can have a molecular weight value for $(R^2O)_n$ divided by a sum of the molecular weight values of $(R^2O)_n$ and $(R^3O)_m$ has a value of 0.05 to 0.5. In other words, the $(R^2O)_n$ moiety is 5 wt. % to 50 wt. % of the $(R^2O)_n(R^3O)_m$ moiety of Formula I, where the molecular weight of both $(R^2O)_n$ and $(R^3O)_m$ sum to 1.0, or 100 wt. % of the $(R^2O)_n(R^3O)_m$ moiety of Formula I.

Other values for the molecular weight value for $(R^2O)_n$ and/or $(R^3O)_m$ according to the above description are possible. For example, individual values and subranges of the molecular weight value for $(R^3O)_m$ divided by a sum of the molecular weight values of $(R^2O)_n$ and $(R^3O)_m$ of 0.5 to 0.95 are included herein. So, the molecular weight value for $(R^3O)_m$ divided by a sum of the molecular weight values of $(R^2O)_n$ and $(R^3O)_m$ can have a lower value of 0.5, 0.55 or 0.6 to an upper value of 0.85, 0.90 or 0.95, where any combination of lower value and upper value is possible.

The values for n and m for Formula are each independently integers ranging from 0 to 20, where n+m is greater than 0. Preferably, n+m is 3 to 12. Preferably, n and m are each independently integers ranging from 1 to 5. Preferably, p is an integer from 1 to 4.

The esterified oil soluble polyalkylene glycols of the present disclosure can have a kinematic viscosity at 100° C. that is 6 cSt or less. The esterified oil soluble polyalkylene glycols can have a kinematic viscosity at 40° C. that is less than 25 cSt. In addition, the esterified oil soluble polyalkylene glycols disclosed herein have a kinematic viscosity at 40° C. of less than 25 cSt and kinematic viscosity at 100° C. 6 cSt or less. As such, the esterified oil soluble polyalkylene glycols may advantageously be utilized as low viscosity lubricants and/or for various low viscosity lubricant applications. The esterified oil soluble polyalkylene glycols may have a kinematic viscosity, as determined by ASTM D7042, at 40° C. from a lower limit 8.0 or 9.0 cSt to an upper limit of 24.5 or 24.0 cSt. The esterified oil soluble polyalkylene glycols may have a kinematic viscosity, as determined by ASTM D7042, at 100° C. from a lower limit 1.0 or 2.5 cSt to an upper limit of 6.0 or 5.5 cSt. As mentioned, the esterified oil soluble polyalkylene glycols disclosed herein can advantageously provide relatively lower viscosities at low temperatures, as compared to some other lubricants, such as similar non-esterified oil soluble polyalkylene glycols.

The esterified oil soluble polyalkylene glycols of the present disclosure can also have a viscosity index determined according to ASTM D2270 from 130 to 200. All individual values and subranges from 130 to 200 are included; for example, the esterified oil soluble polyalkylene glycols of the present disclosure may have a viscosity index from a lower limit of 130 or 135 to an upper limit of 200 or 195. This improved viscosity index, as compared to some other lubricants, such as similar non-esterified oil soluble polyalkylene glycols, is advantageous to previous a previous process for increasing viscosity index, i.e. an alkylation capping process, because esterification can be achieved via a simpler process and/or at a reduced cost.

The esterified oil soluble polyalkylene glycols of the present disclosure are, as discussed herein, oil soluble (are miscible) in a base oil. For example, 10 to 0.01 wt. % of the esterified oil soluble polyalkylene glycols of the present disclosure can be solubilized in 90 to 99.9 weight percent (wt. %) of a base oil, where the wt. % is based on the total weight of mixture of the esterified oil soluble polyalkylene glycol(s) and the base oil.

As used herein, the base in which the esterified oil soluble polyalkylene glycols of the present disclosure are soluble can be selected from the group consisting of an American Petroleum Institute (API) Group I hydrocarbon base oil, an API Group II hydrocarbon base oil, an API Group III hydrocarbon base oil, an API Group IV hydrocarbon base oil and a combination thereof. Preferably, the base oil of the lubricant formulation is an API Group III hydrocarbon base oil. The composition of API Group I-IV hydrocarbon oils are as follows. Group II and Group III hydrocarbon oils are typically prepared from conventional Group I feed stocks using a severe hydrogenation step to reduce the aromatic, sulfur and nitrogen content, followed by de-waxing, hydro-finishing, extraction and/or distillation steps to produce the finished base oil. Group II and III base stocks differ from conventional solvent refined Group I base stocks in that their sulfur, nitrogen and aromatic contents are very low. As a result, these base oils are compositionally very different from conventional solvent refined base stocks. The API has categorized these different base stock types as follows: Group I, >0.03 wt. % sulfur, and/or <90 vol % saturates, viscosity index between 80 and 120; Group II, ≤0.03 wt. % sulfur, and ≥90 vol % saturates, viscosity index between 80 and 120; Group III, ≤0.03 wt. % sulfur, and ≥90 vol % saturates, viscosity index >120. Group IV are polyalphaolefins (PAO). Hydrotreated base stocks and catalytically dewaxed base stocks, because of their low sulfur and aromatics content, generally fall into the Group II and Group III categories.

By way of example and not limitation, embodiments of the present disclosure provide that the esterified oil soluble polyalkylene glycols are oil soluble, e.g., the esterified oil soluble polyalkylene glycols exhibit miscibility in API Group I, mineral oils at weight percent levels from 10/90 to 90/10 esterified oil soluble polyalkylene glycol/mineral oil. An example of a Group I mineral oil is Total 150SN available from Total.

Embodiments of the present disclosure provide a method for reducing NOACK Air volatility according to ASTM D6375. The method includes reacting a low viscosity oil soluble polyalkylene glycol with a carboxylic acid to provide and esterified oil soluble polyalkylene glycol having Formula I:

R$^1$[O(R$^2$O)$_n$(R$^3$O)$_m$(C=O)R$^4$]$_p$    Formula I where the esterified oil soluble polyalkylene glycol of Formula I is as described herein. So, briefly, R$^1$ is a linear alkyl having 1 to 18 carbon atoms, a branched alkyl having 4 to 18 carbon atoms or an aryl with 6 to 30 carbon atoms; R$^2$O is an oxypropylene moiety derived from 1,2-propylene oxide; R$^3$O is an oxybutylene moiety derived from butylene oxide, where R$^2$O and R$^3$O are in a block or a random distribution; R$^4$ is a linear alkyl with 1 to 18 carbon atoms, a branched alkyl with 4 to 18 carbon atoms or an aryl with 6 to 18 carbon atoms; n and m are each independently integers ranging from 0 to 20 where n+m is greater than 0, p is an integer from 1 to 4 and where the esterified oil soluble polyalkylene glycol has a reduced NOACK Air volatility as compared to the low viscosity oil soluble polyalkylene glycol.

Embodiments of the present disclosure also provide a method for increasing viscosity index as determined according to ASTM D2270. The method includes reacting a low viscosity oil soluble polyalkylene glycol with a carboxylic acid to provide and esterified oil soluble polyalkylene glycol having Formula I:

R$^1$[O(R$^2$O)$_n$(R$^3$O)$_m$(C=O)R$^4$]$_p$    Formula I where the esterified oil soluble polyalkylene glycol of Formula I is as described herein. So, briefly, R$^1$ is a linear alkyl having 1 to 18 carbon atoms, a branched alkyl having 4 to 18 carbon atoms or an aryl with 6 to 30 carbon atoms; R$^2$O is an oxypropylene moiety derived from 1,2-propylene oxide; R$^3$O is an oxybutylene moiety derived from butylene oxide, where R$^2$O and R$^3$O are in a block or a random distribution; R$^4$ is a linear alkyl with 1 to 18 carbon atoms, a branched alkyl with 4 to 18 carbon atoms or an aryl with 6 to 18 carbon atoms; n and m are each independently integers ranging from 0 to 20 where n+m is greater than 0, and p is an integer from 1 to 4 and where the esterified oil soluble polyalkylene glycol has an increased viscosity index as compared to the low viscosity oil soluble polyalkylene glycol.

The present disclosure additionally provides for a method for providing a decreased kinematic viscosity as determined according to ASTM D7042, where the method includes reacting a low viscosity oil soluble polyalkylene glycol with a carboxylic acid to provide an esterified oil soluble polyalkylene glycol having Formula I:

R$^1$[O(R$^2$O)$_n$(R$^3$O)$_m$(C=O)R$^4$]$_p$    Formula I where R$^1$ is a linear alkyl having 1 to 18 carbon atoms, a branched alkyl having 4 to 18 carbon atoms or an aryl with 6 to 30 carbon atoms; R$^2$O is an oxypropylene moiety derived from 1,2-propylene oxide; R$^3$O is an oxybutylene moiety derived from butylene oxide, where R$^2$O and R$^3$O are in a block or a random distribution; R$^4$ is a linear alkyl with 1 to 18 carbon atoms, a branched alkyl with 4 to 18 carbon atoms or an aryl with 6 to 18 carbon atoms; n and m are each independently integers ranging from 0 to 20 wherein n+m is greater than 0, and p is an integer from 1 to 4 and where the esterified oil soluble polyalkylene glycol has a decreased kinematic viscosity as compared to the low viscosity oil soluble polyalkylene glycol at a temperature at or below 0° C. The temperature may be at or below −10° C.; the temperature may be at or below −20° C.

The present disclosure additionally provides for a method for providing a decreased dynamic viscosity as determined according to ASTM D7042, where the method includes reacting a low viscosity oil soluble polyalkylene glycol with a carboxylic acid to provide an esterified oil soluble polyalkylene glycol having Formula I:

R$^1$[O(R$^2$O)$_n$(R$^3$O)$_m$(C=O)R$^4$]$_p$    Formula I where R$^1$ is a linear alkyl having 1 to 18 carbon atoms, a branched alkyl having 4 to 18 carbon atoms or an aryl with 6 to 30 carbon atoms; R$^2$O is an oxypropylene moiety derived from 1,2-propylene oxide; R$^3$O is an oxybutylene moiety derived from butylene oxide, where R$^2$O and R$^3$O are in a block or a random distribution; R$^4$ is a linear alkyl with 1 to 18 carbon atoms, a branched alkyl with 4 to 18 carbon atoms or an aryl with 6 to 18 carbon atoms; n and m are each independently integers ranging from 0 to 20 wherein n+m is greater than 0, and p is an integer from 1 to 4 and where the esterified oil soluble polyalkylene glycol has a decreased dynamic viscosity as compared to the low viscosity oil soluble polyalkylene glycol at a temperature at or below 0° C. The temperature may be at or below −10° C.; the temperature may be at or below −20° C.

Examples

In the Examples, various terms and designations for materials are used including, for instance, the following:

OSP-1 (oil soluble polyalkylene glycol, UCON™ OSP-12, dodecanol initiated random copolymer [50 weight percent propylene oxide/50 weight percent butylene oxide], available from The Dow Chemical Company); OSP-2 (oil soluble polyalkylene glycol, UCON™ OSP-18, dodecanol initiated random copolymer [50 weight percent propylene oxide/50 weight percent butylene oxide], available from The Dow Chemical Company); p-toluenesulfonic acid [PTSA] (acid catalyst, available from Sinopharm Chemical Reagent Co. Ltd (SCRC); sodium carbonate (neutralizer, available from SCRC); potassium hydroxide (neutralizer, available from SCRC) magnesium silicate (salt absorber, available from SCRC); acetic acid (acid, available from SCRC); propanoic acid (acid, available from SCRC); n-pentanoic acid (acid, available from Energy Chemical); isovaleric acid (acid, containing >99 weight percent of 3-methylbutanoic acid, available from Energy Chemical); caprylic acid (acid, available from SCRC); dodecanoic acid (acid, available from SCRC).

Example 1, an esterified oil soluble polyalkylene glycol having a formula: R$^1$[O(R$^2$O)$_n$(R$^3$O)$_m$ (C=O)R$^4$]$_p$, wherein: R$^1$ and R$^4$ are each independently an alkyl group having 18 or fewer carbons or an aryl group having from 6 to 30 carbons; (R$^3$O)$_m$ is an oxypropylene moiety derived from 1,2-propylene oxide; R$^3$O is an oxybutylene moiety derived from 1,2-butylene oxide, n+m is an integer from 3 to 12 and p had a value of 1 was formed as follows. OSP-2 (350 g, 0.749 mol), acetic acid (45 g, 0.749 mol, 43.0 mL), and toluene (500 mL) were added to a container and stirred. PTSA (1.42 g, 0.00749 mol) was added to the container with stirring and the contents of the container were refluxed with a Dean-Stark apparatus at 135° C. for 4 hours to remove water; then, the contents of the container were cooled to room temperature. Sodium carbonate (50 g) was added to the container and the contents were stirred for approximately 12 hours. Magnesium silicate (10 g) was added to the container and the contents were stirred at 60° C. for 3 hours. Then the contents of container were filtered through filter paper and residual solvent was removed by vacuum distillation to obtain approximately 300 g of Example 1.

Example 2 was formed as Example 1, with the change that propanoic acid (55.5 g, 0.749 mol, 56.0 mL) was utilized rather than acetic acid, to obtain approximately 310 g of Example 2.

Example 3 was formed as Example 1, with the change that n-pentanoic acid (76.5 g, 0.749 mol) was utilized rather than acetic acid, to obtain approximately 330 g of Example 3.

Example 4 was formed as Example 1, with the change that isovaleric acid (76.5 g, 0.749 mol) was utilized rather than acetic acid, to obtain approximately 335 g of Example 4.

Example 5 was formed as Example 1, with the change that caprylic acid (108 g, 0.749 mol) was utilized rather than acetic acid, to obtain approximately 356 g of Example 5.

Example 6 was formed as Example 1, with the change that dodecanoic acid (150 g, 0.749 mol) was utilized rather than acetic acid, to obtain approximately 389 g of Example 6.

Example 7, an esterified oil soluble polyalkylene glycol having a formula: $R^1[O(R^2O)_n(R^3O)_m (C=O)R^4]_p$, wherein: $R^1$ and $R^4$ are each independently an alkyl group having 18 or fewer carbons or an aryl group having from 6 to 30 carbons; $(R^3O)_n$ is an oxypropylene moiety derived from 1,2-propylene oxide; $R^3O$ is an oxybutylene moiety derived from 1,2-butylene oxide, n+m is an integer from 3 to 12 and p had a value of 1 was formed as follows. OSP-1 (374 g, 1 mol), acetic acid (60 g, 1 mol), and toluene (500 mL) were added to a container and stirred. PTSA (1.90 g, 0.001 mol) was added to the container with stirring and the contents of the container were refluxed with a Dean-Stark apparatus at 135° C. for 4 hours to remove water; then, the contents of the container were cooled to room temperature. Potassium hydroxide (1.12 g, 0.002) was added to the container and the contents were stirred for approximately 12 hours. Magnesium silicate (10 g) was added to the container and the contents were stirred at 60° C. for 3 hours. Then the contents of container were filtered through filter paper and residual solvent was removed by vacuum distillation to obtain approximately 390 g of Example 7.

Example 8 was formed as Example 7, with the change that propanoic acid acid (74 g, 1 mol) was utilized rather than acetic acid, to obtain approximately 390 g of Example 8.

Example 9 was formed as Example 7, with the change that n-pentanoic acid (102 g, 1 mol) was utilized rather than acetic acid, to obtain approximately 388 g of Example 9.

Example 10 was formed as Example 7, with the change that isovaleric acid (102 g, 1 mol) was utilized rather than acetic acid, to obtain approximately 376 g of Example 10.

Example 11 was formed as Example 7, with the change that caprylic acid (144 g, 1 mol) was utilized rather than acetic acid, to obtain approximately 420 g of Example 11.

Example 12 was formed as Example 7, with the change that dodecanoic acid (200 g, 1 mol) was utilized rather than acetic acid, to obtain approximately 450 g of Example 12.

Kinematic viscosity and dynamic viscosity were determined according to ASTM D7042 [$KV_{40}$ is the kinematic viscosity at 40° C., $KV_{100}$ is the kinematic viscosity at 100° C., $KV_{-20}$ is the kinematic viscosity at −20° C., $DV_{-20}$ is the dynamic viscosity at −20° C.]. Viscosity index was determined according to ASTM D2270. Pour point was determined according to ASTM D97. NOACK volatility was determined according to ASTM D6375. The results are reported in Table 1 and Table 2.

NOACK measurements were made using thermo-gravimetric analysis (TGA). The specimen to be analyzed was placed in an appropriate TGA specimen pan. The pan was placed on the TGA pan holder and heated to between 247 and 249° C. under a stream of air, and held isothermal for 1 hour. Throughout this process, the TGA monitored and recorded the mass loss experienced by the specimen due to evaporation. NOACK measurements in air (NOACK air) provide information on the thermal and oxidative stability of the specimen. NOACK measurements in nitrogen (NOACK $N_2$) provide information on the thermal stability of the 1 specimen.

TABLE 1

| | Pour Point (° C.) | Viscosity Index | $KV_{100}$ (cSt) | $KV_{40}$ (cSt) | $KV_{-20}$ (cSt) | $DV_{-20}$ (mPa s) | NOACK Air (wt %) | NOACK $N_2$ (wt %) |
|---|---|---|---|---|---|---|---|---|
| Example 1 | −46 | 192 | 4.27 | 15.8 | 423 | 407 | 33.0 | 13.9 |
| Example 2 | −47 | 172 | 3.99 | 15.1 | 345 | 331 | 31.8 | 9.8 |
| Example 3 | −55 | 160 | 4.01 | 15.8 | 342 | 326 | 24.0 | 7.1 |
| Example 4 | −55 | 184 | 4.20 | 15.8 | 435 | 414 | 25.4 | 7.5 |
| Example 5 | −53 | 178 | 4.68 | 18.9 | 434 | 411 | 21.5 | 3.7 |
| Example 6 | −30 | 187 | 5.61 | 23.9 | 595 | 559 | 14.4 | 1.8 |
| Comparative Example A (OSP-2) | −41 | 121 | 4.10 | 18.6 | 762 | 723 | 33.5 | 13.1 |

The data of Table 1 illustrates that each of Example 1-6 has an improved, i.e., increased, viscosity index, as compared to Comparative Example A. The data of Table 1 also illustrates that each of Example 1-6 has an improved, i.e., decrease in low temperature kinematic viscosity, $KV_{-20}$ as compared to Comparative Example A and an improved, i.e., decrease in low temperature dynamic viscosity, $DV_{-20}$ as compared to Comparative Example A. The data of Table 1 illustrates that each of Example 1-6 has an improved, i.e., decreased, NOACK Air weight percent, as compared to Comparative Example A.

TABLE 2

|  | Pour Point (° C.) | Viscosity Index | KV$_{100}$ (cSt) | KV$_{40}$ (cSt) | KV$_{-20}$ (cSt) | DV$_{-20}$ (mPa s) | NOACK Air (wt %) | NOACK N$_2$ (wt %) |
|---|---|---|---|---|---|---|---|---|
| Example 7 | −35 | 139 | 2.79 | 9.6 | 184 | 175 | 55.1 | 27.4 |
| Example 8 | −40 | 168 | 2.85 | 9.3 | 142 | 135 | 46.8 | 22.9 |
| Example 9 | −43 | 171 | 3.06 | 10.2 | 157 | 148 | 39.2 | 18.5 |
| Example 10 | −45 | 153 | 3.10 | 10.9 | 194 | 183 | 41.6 | 19.4 |
| Example 11 | −45 | 164 | 3.40 | 12.2 | 214 | 200 | 27.0 | 10.2 |
| Example 12 | −20 | 173 | 4.16 | 16.1 | 320 | 297 | 16.2 | 3.6 |
| Comparative Example B (OSP-1) | −29 | 88 | 2.93 | 12.1 | 542 | 510 | 58.6 | 38.3 |

The data of Table 2 illustrates that each of Example 7-12 has an improved, i.e., increased, viscosity index, as compared to Comparative Example B. The data of Table 2 also illustrates that each of Example 7-12 has an improved, i.e., decrease in low temperature kinematic viscosity, KV$_{-20}$ as compared to Comparative Example B and an improved, i.e., decrease in low temperature dynamic viscosity, DV$_{-20}$ as compared to Comparative Example B. The data of Table 2 illustrates that each of Example 7-12 has an improved, i.e., decreased, NOACK Air weight percent, as compared to Comparative Example B.

What is claimed:

1. An esterified oil soluble polyalkylene glycol having Formula I:

$$R^1[O(R^2O)_n(R^3O)_m(C=O)R^4]_p \qquad \text{Formula I}$$

wherein $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1,2-propylene oxide; $R^3O$ is an oxybutylene moiety derived from butylene oxide, wherein $R^2O$ and $R^3O$ are in a block or a random distribution; $R^4$ is a linear alkyl with 1 to 18 carbon atoms, a branched alkyl with 4 to 18 carbon atoms or an aryl with 6 to 18 carbon atoms; n and m are each independently integers ranging from 0 to 20 wherein n+m is greater than 0, and p is an integer from 1 to 4.

2. The esterified oil soluble polyalkylene glycol of claim 1, wherein a molecular weight value for $(R^3O)_m$ divided by a sum of the molecular weight values of $(R^2O)_n$ and $(R^3O)_m$ has a value of 0.5 to 0.95.

3. The esterified oil soluble polyalkylene glycol of claim 1, wherein the esterified oil soluble polyalkylene glycol has a kinematic viscosity at 100° C. that is 6 cSt or less.

4. The esterified oil soluble polyalkylene glycol of claim 1, wherein the esterified oil soluble polyalkylene glycol has a kinematic viscosity at 40° C. that is less than 25 cSt.

5. The esterified oil soluble polyalkylene glycol of claim 1, wherein $R^1$ is a linear alkyl.

6. The esterified oil soluble polyalkylene glycol of claim 1, wherein $R^1$ is branched.

7. The esterified oil soluble polyalkylene glycol of claim 1, wherein the esterified oil soluble polyalkylene glycol has a viscosity index determined according to ASTM D2270 from 130 to 200.

8. A method for reducing NOACK Air volatility according to ASTM D6375, the method comprising:

reacting an oil soluble polyalkylene glycol with a carboxylic acid to provide and esterified oil soluble polyalkylene glycol having Formula I:

$$R^1[O(R^2O)_n(R^3O)_m(C=O)R^4]_p \qquad \text{Formula I}$$

wherein $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1,2-propylene oxide; $R^3O$ is an oxybutylene moiety derived from butylene oxide, wherein $R^2O$ and $R^3O$ are in a block or a random distribution; $R^4$ is a linear alkyl with 1 to 18 carbon atoms, a branched alkyl with 4 to 18 carbon atoms or an aryl with 6 to 18 carbon atoms; n and m are each independently integers ranging from 0 to 20 wherein n+m is greater than 0, and p is an integer from 1 to 4; and wherein the esterified oil soluble polyalkylene glycol has a reduced NOACK Air volatility as compared to the oil soluble polyalkylene glycol.

9. A method for providing a decreased viscosity as determined according to ASTM D7042, the method comprising:

reacting an oil soluble polyalkylene glycol with a carboxylic acid to provide an esterified oil soluble polyalkylene glycol having Formula I:

$$R^1[O(R^2O)_n(R^3O)_m(C=O)R^4]_p \qquad \text{Formula I}$$

wherein $R^1$ is a linear alkyl having 1 to 18 carbon atoms, a branched alkyl having 4 to 18 carbon atoms or an aryl with 6 to 30 carbon atoms; $R^2O$ is an oxypropylene moiety derived from 1,2-propylene oxide; $R^3O$ is an oxybutylene moiety derived from butylene oxide, wherein $R^2O$ and $R^3O$ are in a block or a random distribution; $R^4$ is a linear alkyl with 1 to 18 carbon atoms, a branched alkyl with 4 to 18 carbon atoms or an aryl with 6 to 18 carbon atoms; n and m are each independently integers ranging from 0 to 20 wherein n+m is greater than 0, and p is an integer from 1 to 4; and wherein the esterified oil soluble polyalkylene glycol has a decreased viscosity as compared to the oil soluble polyalkylene glycol at a temperature at or below 0° C.

10. The method of claim 9, wherein the viscosity is selected from kinematic viscosity and dynamic viscosity.

* * * * *